Feb. 13, 1934.  F. E. DEEMS  1,946,783

HULL EXTRACTOR FOR COTTON

Filed Nov. 3, 1930

INVENTOR

F. E. Deems

BY

ATTORNEYS

Patented Feb. 13, 1934

1,946,783

UNITED STATES PATENT OFFICE 1,946,783

HULL EXTRACTOR FOR COTTON

Frank E. Deems, Birmingham, Ala., assignor to Continental Gin Company, a corporation of Delaware Application November 3, 1930. Serial No. 493,101

13 Claims. (Cl. 19—37)

My invention relates to an apparatus for extracting hulls and trash from seed cotton, and contemplates the provision in a suitable extractor casing of a plurality of saw cylinders rotating in opposite directions and having feed means by which the seed cotton and hulls to be treated reach the upper saw cylinder in position to be moved therewith downwardly into the working chamber in the extractor casing. The lower saw cylinder is disposed in position to receive on its up-going side the hulls and such cotton as was thrown or stripped from the downgoing side of the upper saw cylinder. The lower saw cylinder will carry the cotton engaged thereby upwardly past a suitable stripper, if such be desired, into position to be doffed therefrom onto the upper saw cylinder which will carry it, along with the cotton already thereon, to the final doffing point.

My invention contemplates disposing on the downgoing side of the upper saw cylinder a stripping means which will mechanically knock from the cotton stream hulls and part of the cotton and cause same to pass into engagement with the upgoing side of the lower saw cylinder.

My invention further contemplates providing a final stripping means past which the combined streams of cotton from both saw cylinders will pass in approaching the final doffing point.

My invention in its broader aspect contemplates dividing the cotton for treatment by the two saw cylinders and combining the cotton streams on one of the saw cylinders, preferably the upper because that will enable me to strip the combined streams of cotton and knock off the hulls and trash in a direction which will not cause same to intersect, and again become more or less commingled with, the cotton streams or either of them. Further, the hulls in two streams are conducted to a common exit point and are treated there to recapture cotton tending to pass out therewith and be lost.

My invention further contemplates disposing a relatively small reclaiming saw below, and rotating it in the same direction with, the lower saw cylinder, such reclaiming saw being associated with a picker roller and a doffing roller. This picker roller is adapted to engage all hulls and any accompanying cotton escaping between the lower saw cylinder, and its hull board means on one side and the casing wall on the other side and to deliver same to the downgoing side of the reclaiming saw, and it is adapted also to return the cotton, doffed from the reclaiming saw, to the lower saw cylinder. The hulls and foreign matter that are stripped on the upgoing side of the upper saw cylinder, fall into position to be engaged by the downgoing side of the lower saw cylinder and delivered thereby to said picker roller and thence to the reclaiming saw. Thus, all hulls ejected from the cotton streams at all stripping points in the casing will be acted on by the reclaiming saw and any adhering cotton caught and removed therefrom before the hulls are finally discharged. This reclaiming saw mechanism is similar to that described and claimed in an application of Thomas Elliott, Serial No. 442,642, and is not claimed herein except in the general combination with the double saw cylinder assembly.

My invention further comprises the novel details of construction and arrangements of parts, which in their preferred embodiments only are illustrated in the accompanying drawing which forms a part of this specification, and in which:—

Similar reference numerals refer to similar parts throughout the drawing.

Figure 1:
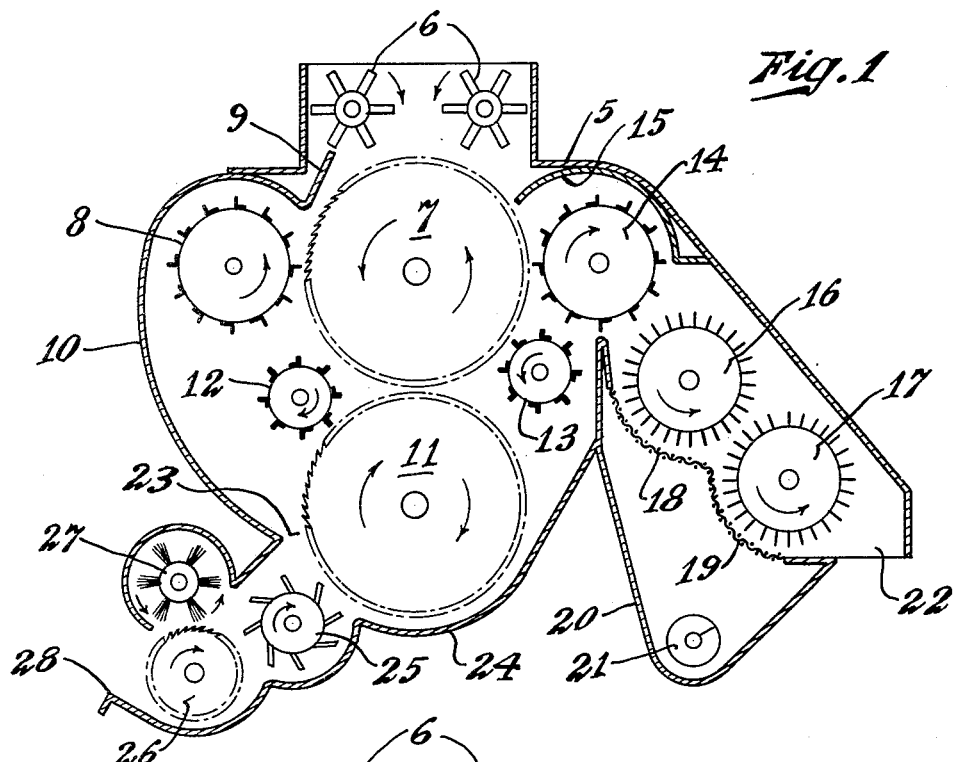
Fig. 1 is a vertical transverse cross-sectional view taken through a cotton hull extractor casing with the driving means omitted and the arrows indicating the direction of rotation of the working parts.

In the embodiment of my invention illustrated, the seed cotton, with hulls and trash to be removed therefrom, is fed into the extractor casing 5 by any suitable feed means such as the feed rolls 6 which rotate reversely and serve to afford a regular mechanical feed of the cotton and hulls into the casing for treatment. Below, and juxtaposed to, the feed rolls is the upper saw cylinder 7 which receives the cotton and hulls overhead and carries them in a counter-clockwise direction downwardly into the working chamber of the casing. A stripper roller 8 of any suitable character is arranged on the downgoing side of the saw cylinder 7, preferably with its axis slightly above the axis of the saw 6. The guide 9 will prevent the stripper roller from throwing hulls and cotton back onto the upper saw and will cause such hulls and cotton to pass around with the stripper roller following a curved wall 10 of the casing which serves as a hull board means for a lower saw cylinder 11.

The saw cylinder 11 rotates in the opposite direction to the upper saw cylinder 7 and with a relatively lower peripheral speed. Preferably, this lower saw is disposed so that it can be doffed by the upper saw but any suitable doffing means may be substituted for this direct action to effect a transfer of the seed cotton from the lower saw cylinder onto the upper saw cylinder 7.

Figure 2:
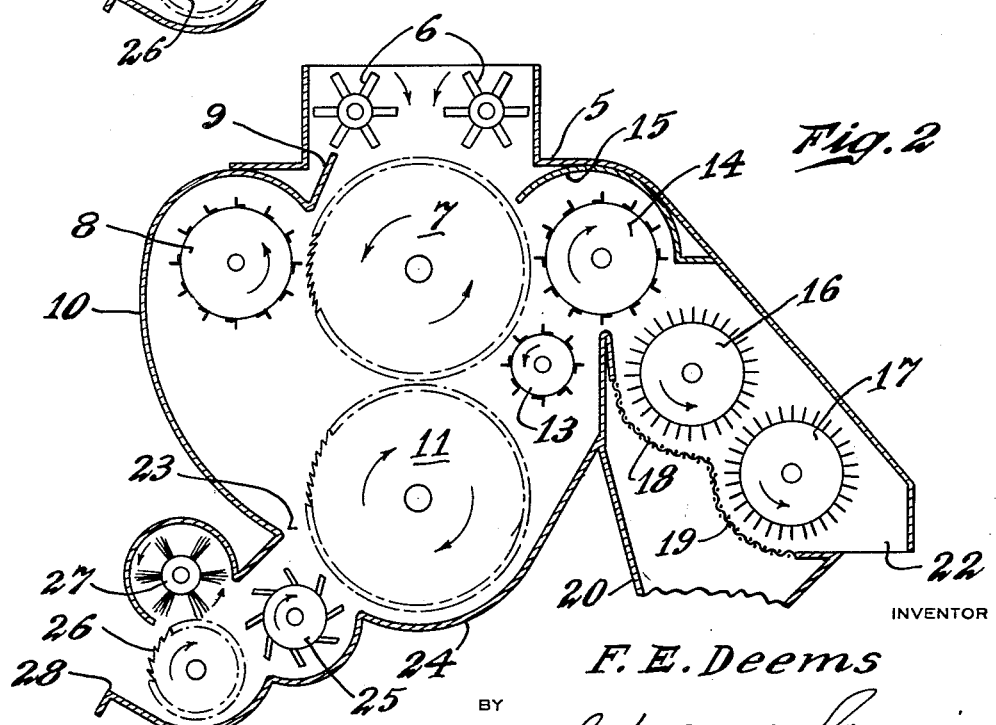
Fig. 2 is a view similar to Fig. 1 showing a modification in which the stripping operation on the upgoing side of the lower saw cylinder is omitted.

In Fig. 1 I show the lower saw cylinder 11 having associated therewith on its upgoing side a stripper roller 12, and in Fig. 2 I omit this stripper roller because under certain conditions, and when treating certain grades of cotton, it may be desirable to dispense with this stripping action. This stripper roller 12 is disposed so as to be out of the path of the hulls and cotton discharged from the upper stripper roller and is so spaced with relation to the upper saw cylinder that it has no function or duty in respect thereto.

Assuming that the cotton has been doffed from the lower saw cylinder 11 onto the upper saw cylinder 7 and is traveling upwardly therewith, it can be subjected, where such is desired, to a final stripping action by the stripper roller 13 which will thus again strip saw cylinder 7 then carrying both streams of cotton. The cotton left on the upper saw cylinder after passing the stripper roller 13 will be doffed therefrom by any suitable doffing means 14 and directed by the guide 15 to a series of cleaning cylinders 16 and 17 working over screen concaves 18 and 19. The trash and dirt screened out passes into the hopper 20 and is carried off by a conveyor or any other suitable means 21, the seed cotton being delivered through a chute 22 to the gin or other point of use.

The action of the reclaiming saw on the outgoing hulls is substantially that described in the Elliott application aforesaid and will therefore only be briefly described as follows.

Hulls escaping through the throat 23 between the hull board 10 and lower saw cylinder 11 and the hulls carried around under the lower saw cylinder over the concave bottom 24 of the casing will all come into position to be engaged by the picker roller 25 and the hulls and cotton coming from above will be delivered thereby to the saw cylinder 11 and the hulls brought forward over wall 24 will, together with any accompanying cotton, be delivered to the reclaiming saw 26. This saw 26, rotating in clockwise direction, will collect the cotton from the hulls and present it to its doffing means 27 which in turn will deliver it to the upper side of the picker roller 25, and this in turn will deliver it back into position to be acted on by the lower saw cylinder 11. The hulls and trash will be gradually discharged over the overflow lip 28 on the upgoing side of the reclaiming saw. The height of this lip and its relative spacing to the reclaiming saw determine the rate of discharge of the hulls responsive to the action thereon of the teeth of the reclaiming saw.

In operation, the hulls and cotton being fed at uniform rate to the upper saw cylinder 7 are carried therewith past the stripping roller 8 and the cotton and hulls knocked off by this stripping roller are delivered to the lower saw cylinder 11 and the cotton engaged thereby is carried upwardly past its respective stripper roller 12 and is doffed by the upper saw. This saw 7 carries both streams of seed cotton upwardly past the final stripper 13 and delivers it to the doffer 14 from whence it is discharged from the apparatus. The hulls stripped from the cotton on both sides of the saw cylinders 7 and 11 find their way down to the reclaiming saw and are given a final treatment thereby before making their escape from the extractor casing. By this arrangement all of the cotton is stripped twice, and that part which is engaged by the lower saw is stripper three times, and all of the hulls after contact with both saw cylinders are finally subjected to a cotton reclaiming operation before discharge.

It will be understood where I refer to a saw cylinder herein that by such term I mean to include any toothed element that will effectively engage the seed cotton and will permit hulls and trash to be stripped therefrom while carrying it around to the doffer. If desired the cleaning may be omitted and the seed cotton as doffed delivered directly to the gin or other point of use.

When the stripper roller 12 is omitted, I consider it essential that the stripper roller 13 be provided, but where the stripper rollers 8 and 12 are used if desired the stripper roller 13 may be omitted.

While I prefer to use the reclaiming saw 26 and its coacting elements as the most efficient means for recapturing the cotton that tends to make its escape with the hulls, nevertheless, in its broader aspect my invention is not limited to any particular means for recapturing cotton from the outgoing hulls.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. In a hull extractor, a pair of saw cylinders, means including a rotary element to cause the cotton to be treated by both cylinders in divided streams, and to combine on one of said cylinders before being finally doffed, means to strip one of the divided streams of cotton before they are combined and means to strip hulls from the combined streams and discharge same so as not to intersect the path of the cotton in its approach to said cylinders.

2. In a hull extractor, a pair of saw cylinders, means to cause the cotton to be treated by both cylinders in divided streams and to combine on one of said cylinders before being finally doffed, said means including an element acting to strip one of the cotton streams before it is combined with the other stream, and means to strip hulls from the combined streams and discharge same so as not to intersect the path of the cotton in its approach to said cylinders.

3. In a hull extractor, a pair of saw cylinders, means to cause the cotton to be treated by both cylinders in divided streams and to combine on one of said cylinders before being finally doffed, means to strip each of the divided streams of the cotton before they are combined, and means to strip hulls from the combined streams and discharge same so as not to intersect the path of the cotton in its approach to said cylinders.

4. In an apparatus of the character described, means to deliver a stream of seed cotton with accompanying hulls and trash into the apparatus, an initial cylinder to receive the stream and carry it downwardly into the treatment zone, means effective in said zone for the diversion from the cotton stream of hulls and trash on the downgoing side of said cylinder, means for the second treatment of the cotton stream on the upgoing side of said saw cylinder for the removal of hulls and trash, a secondary saw cylinder, means to guide the diverted hulls and trash from both sides of the first mentioned saw cylinder into engagement with the second mentioned saw cylinder on opposite sides thereof, there being a discharge for the hulls and trash, means to recapture therefrom any escaping cotton and restore it to the second mentioned saw cylinder, the elements carrying the cotton streams being adapted to combine same on the first mentioned cylinder, and means to doff said latter cylinder.

5. A hull extractor for seed cotton and the like comprising a feed means adapted to deliver the seed cotton and hulls in a stream for treatment, two reversely driven saw cylinders at different levels, the upper being adapted to receive the stream of seed cotton to be treated and disposed to doff cotton from the other saw cylinder, stripper means coacting with the downgoing and upgoing sides of the upper saw cylinder, means to divert the hulls and cotton stripped from the downgoing side of the upper saw cylinder out of the main cotton stream and into engagement with the upgoing side of the lower saw cylinder, there being an escape provided for hulls past the lower saw cylinder on both sides, and means to doff the combined streams of cotton from the saw cylinder carrying them.

6. In a hull extractor for seed cotton having a top feed means, a pair of saw cylinders at different levels reversely driven so as to pass the cotton they respectively collect between them and arranged one to doff the other, means which divert from the main cotton stream on the upper cylinder, hulls and accompanying cotton and deliver same to the lower cylinder for treatment, means to strip and doff the combined streams of cotton, a final cotton reclaiming saw, means to deliver thereto for treatment all hulls rejected from both saw cylinders after their escape past the lower saw cylinder, and means to doff said reclaiming saw.

7. A hull extractor for seed cotton according to claim 11, in combination with means to recapture cotton from the escaping hulls, and hull discharge means adapted to direct the escaping hulls stripped from the cotton on both sides of said saw cylinders to said recapture means.

8. A hull extractor for seed cotton and the like comprising a feed means, two reversely driven saw cylinders at different levels, the upper being adapted to receive the seed cotton to be treated and to doff cotton from the lower saw cylinder, a stripper coacting with the downgoing side of the upper saw cylinder to divert the stripped hulls away from the main cotton stream, and guide means to deliver the same with any accompanying cotton to the upgoing side of the lower saw cylinder, means to doff the combined streams of cotton from the upper saw cylinder, means defining an escape of hulls past the lower saw cylinder, and means acting on the cotton collected by the lower saw cylinder to strip it in advance of said doffing means.

9. A hull extractor according to claim 8, in which the last mentioned stripping means comprises two stripping rollers, one working on the upgoing side of the lower saw cylinder and the other on the upgoing side of the upper saw cylinder.

10. In a hull extractor, the combination with a feed means, an upper saw cylinder which receives the cotton to be treated, a stripper roller and a hull guide means on the downgoing side of said saw cylinder which directly deliver hulls stripped by said roller from the upper saw cylinder to a lower saw cylinder, a lower saw cylinder oppositely rotatable to the upper saw cylinder and adapted to be doffed thereby, means to doff the combined streams of cotton from the upgoing side of the upper saw cylinder, means to apply a second stripping operation to the cotton engaged by the upper saw cylinder, a reclaiming saw, means to bring all hulls stripped from both saw cylinders into engagement with said reclaiming saw before they escape from the extractor casing, and doffing means to effect the return of cotton collected by said reclaiming saw to said lower saw cylinder.

11. A hull extractor for seed cotton, comprising an upper inlet for seed cotton and hulls, an upper saw cylinder arranged to receive the cotton and hulls to be treated in a stream and carry them downwardly into the working chamber of the extractor, a stripper roller working on the downgoing stream of cotton to divert hulls and trash therefrom, a lower saw cylinder which receives on its upgoing side the cotton stripped with the hulls from the main cotton stream by said stripper roller and returns same to the upper saw cylinder, means to strip the cotton stream on the upgoing side of the upper saw cylinder, means defining an outlet for the stripped hulls, and means to doff the cotton from the upper saw cylinder.

12. A hull extractor for seed cotton according to claim 11, in which hull discharge means direct the hulls on each side of the lower saw cylinder toward the hull outlet, in combination with a picker roller, reclaiming saw and doffer acting on both streams of escaping hulls to recapture cotton therefrom and return it to the lower saw cylinder.

13. A hull extractor for seed cotton according to claim 11 in combination with a stripper roller working on the cotton stream carried on the upgoing side of the lower saw cylinder.

FRANK E. DEEMS.